United States Patent [19]

Sadler et al.

[11] 4,335,755

[45] Jun. 22, 1982

[54] COATING FOR PIPE

[75] Inventors: Thomas H. Sadler; Daniel G. Richlie, both of Jefferson County, Colo.

[73] Assignee: Manville Service Corporation, Denver, Colo.

[21] Appl. No.: 252,517

[22] Filed: Apr. 9, 1981

[51] Int. Cl.³ .......................... F16L 9/14; B05D 3/02; B32B 9/04
[52] U.S. Cl. .................................... 138/145; 138/175; 427/387; 427/397.7; 428/36; 428/341; 428/447
[58] Field of Search .............. 427/387, 397.7; 428/36, 428/219, 340, 341, 321, 447; 138/145, 175

[56] References Cited

U.S. PATENT DOCUMENTS

| | | | |
|---|---|---|---|
| 2,891,920 | 6/1959 | Hyde et al. | 260/29.2 M |
| 3,294,725 | 12/1966 | Findlay et al. | 260/29.2 M |
| 3,372,052 | 3/1968 | Polniaszek | 427/387 |
| 3,488,206 | 1/1970 | Munder et al. | 138/145 |
| 3,676,196 | 7/1972 | Quint et al. | 427/236 |
| 4,221,688 | 9/1980 | Johnson et al. | 260/29.2 M |

Primary Examiner—William R. Dixon, Jr.
Attorney, Agent, or Firm—Robert M. Krone; Joseph J. Kelly; Gregory W. O'Connor

[57] ABSTRACT

A cured elastomeric film coating, on the surface of a cementitious article, prepared from the application of an aqueous dispersion of colloidal silica and an anionically stabilized hydroxylated polydiorganosiloxane is improved in water impermeability, adhesion to the surface of the article and gains abrasion resistance when the cured film coating is allowed to stand in open air for approximately four weeks prior to use.

14 Claims, No Drawings

COATING FOR PIPE

BACKGROUND OF THE INVENTION

Typically, pipe used to carry water can be made from hydraulic calcareous cement compositions including portland cement, concrete, or asbestos-cement combinations. These materials conventionally can be used alone or as liners for metal or outer casings made from other materials. Such pipe in the past has been chosen for such applications since it exhibited great durability and was economically attractive for such use, particularly in municipal water systems.

The major drawback found in the use of these materials over extended periods of time has been erosion by water and in particular, the erosion caused by low mineral content water, i.e. aggressive water. Specifically, such water tends over time to solubilize small amounts of calcium from the set material, which, if not prevented, can superficially weaken the structure of the surface of the cement in contact with the water and lower its ability to successfully resist the abrasive action of the water flow.

This phenomenon has in the past been successfully arrested by coating the inside of such pipe with an asphaltic composition which is abrasion resistant and adheres well to the inside walls of the pipe for extremely long periods of time in normal use. Such materials have come to be aesthetically undesirable since they can impart an objectionable odor or taste to the water. To overcome this disadvantage several alternatives have been employed. One of the most successful alternatives has been the use of a coating composition made up of a vinyl toluene and alpha methylstyrene copolymer such as described in the patent to Stephen M. Quint, et al., U.S. Pat. No. 3,676,196 issued July 11, 1972. This patent describes applying a coating of such materials to the inside walls of a pipe by spraying a solution of the materials in a solvent such as perchloroethylene, which is then removed by vaporation to create a durable glass-like protective coating for the inside surfaces of the pipe. Again, while the coating is highly successful functionally in this application, the mechanism of solvent evaporation was not preferred since small amounts of the organic solvent, if not completely removed, could be detected in the water.

It is desirable therefore to provide a coating for cementitious pipe that is contacting water that does not have entrapped organic solvents or impart an odor or taste to the water. Further the coating must inhibit dissolution of the calcium at the surface of the pipe in contact with water and exhibit superior adhesion to the cementitious article by remaining in place and intact by resisting the abrasive action of the water moving through the pipe. Such a coating should then prevent erosion of the surface of the pipe in contact with water, particularly aggressive water, and not present any of the aforementioned drawbacks.

While many other materials have proven suitable for waterproofing masonary and the like they have not suggested a solution for the problem of aggressive water leaching calcium ions from cementitious pipe products but have rather concentrated on the problem of imparting water repellancy by providing superficial coatings which created high water contact angles.

The environment for this invention therefore requires an appreciation of the requirements currently necessary for pipe used in municipal water applications and in particular in applications where aggressive waters are present.

It is therefore an objective of this invention to provide an internal coating for pipe which will be used in applications where the coating must provide protection against attack from aggressive water, is abrasion resistant and which is demonstratably inert and imparts negligible odor, color, taste or amounts of other substances to the water.

SUMMARY OF THE INVENTION

It has been found that a water emulsion of an anionically stabilized hydroxylated polydiorganosiloxane in combination with colloidal silica when sprayed in the conventional manner onto the inside surface of a cementitious pipe will cure by the evaporation of water and then subsequently form a coating which is highly abrasion resistant and protects the cement from erosion due to the solubilizing effect of aggressive water without imparting objectionable odor or taste to the water.

As described in the U.S. patent to Johnson, et al., U.S. Pat. No. 4,221,688 issued Sept. 9, 1980, which is incorporated herein by reference, the hydroxylated polydiorganosiloxanes useful for this invention are those which can be emulsified and which will form an elastomeric film coating on the surface to which it is applied after the removal of the water by evaporation. The term "hydroxylated polydiorganosiloxane" for the purposes of this invention is understood to mean that the polymer is essentially linear repeating diorganosiloxane units but also includes polymeric species which contain small numbers of monoorganosiloxane units, up to a maximum of about one monoorganosiloxane unit per each 100 diorganosiloxane units. The hydroxylated polydiorganosiloxanes will therefore have an average of about two silicon-bonded hydroxyls per molecule up to a number of silicon-bonded hydroxyls which is equal to one silicon-bonded hydroxyl for each monoorganosiloxane in the hydroxylated polydiorganosiloxane molecule plus the two chain terminating silicon-bonded hydroxyls. The hydroxylated polydiorganosiloxanes are preferably those which contain about 2 silicon-bonded hydroxyls per molecule.

The most preferred hydroxylated polydiorganosiloxanes are those prepared by the method of anionic emulsion polymerization described by Findlay et al. in U.S. Pat. No. 3,294,725 which is hereby incorporated by reference to show the methods of polymerization and to show the hydroxylated polydiorganosiloxane in emulsion form. Another method of preparing hydroxylated polydiorganosiloxane is described by Hyde et al. in U.S. Pat. No. 2,891,920 which is hereby incorporated by reference to show the method of preparation of the hydroxylated polydiorganosiloxanes useful in the practice of the present invention. These methods and others are well-known in the art. The hydroxylated polydiorganosiloxanes used in this invention are those which are anionically stabilized. For the purpose of this invention "anionically stabilized" means the hydroxylated polydiorganosiloxane is stabilized in emulsion form with an anionic surfactant.

The silicone emulsion used herein has a continuous water phase in which there is a dispersed phase which comprises an anionically stabilized hydroxylated polydiorganosiloxane and colloidal silica. For this silicone emulsion to maintain a storage stability and also be curable to an elastomer after the emulsion is stored, the pH of the silicone emulsion should be within the range of about 9 to about 11.5. The silicone emulsions of this invention which have the best storage stability and still form elastomers at ambient conditions at any point during the storage stable period are those which have a pH in the range of 10.5 to 11.2.

The commercial preparations of such materials have generally an aqueous phase and dispersed phase where the solids content is roughly about 40% by weight of the total weight. To achieve the objectives of the present invention it is preferable to use a preparation having larger aqueous phase and most preferably an aqueous dispersion containing about 30% by weight of solids.

While aqueous dispersions of hydroxylated polydiorganosiloxanes have demonstrated utility for certain water repelling applications such as paint bases and the like their suitability for such applications requires that small amounts of cure accelerating agents must be added to the emulsion in order to obtain a cure to an elastomeric state. Exemplary of such an accelerator is diorganotindicarboxylate which is typically added in amounts of from about 0.1 to 2 parts by weight for each 100 parts by weight of the hydroxylated polydiorganosiloxane. Without this addition it is difficult if not impossible to obtain a cure to the elastomeric state in the material.

It has been found that these elastomers, when applied and cured by means of an added cure accelerating agent onto the surface of the cementitious article, while providing water repellancy, do not exhibit satisfactory water impermeability for their general use as a coating for carrying water. Contrary to expectations, the development water impermeability for the elastomeric coating as well as superior adhesion and abrasion resistance is not achieved upon initial curing but rather can only be made to occur a substantial period of time later. In fact, it is necessary for the coating to be in contact with the cementitious article in open air for approximately four weeks before the desired water impermeability adhesion and abrasion resistance are developed to a satisfactory degree for the article to be useful as a conduit which protects the cementitious pipe from attack by aggressive water. Abrasion resistance is measured by a test derived from a test used by the U.S. Department of the Interior—Bureau of Reclamation and described in Report No. CHE-97, June, 1969. Briefly the test consists of cutting short lengths of pipe, fitting seals to the ends of the section, adding a predetermined amount of water and number four aggregate, and rolling the section on a roll table at a predetermined tangential velocity for a specific period of time. Besides a physical inspection of the action of the abrasive on the coating the increase in calcium ion concentration in aggressive water is determined independently of the abrasion test before and at intervals during the abrasion test. An increase in calcium ion concentration is normally an indicator of either exposed pipe surface or permeability of the coating to ion transport in the water environment.

Without wishing to be held to any specific theory as to the specific mechanisms responsible for the improvement in the critical characteristics which are developed in the article and with the method of the present invention, certain conclusions can be formed. First the presence of added colloidal silica in the aqueous dispersion by itself appears to promote the superior adhesion that must be present between the elastomeric coating and the surface of the cementitious article for the article and the film coating to exhibit the observed abrasion resistance. Also it appears that other materials, such as pigments if additionally added to the emulsion, deleteriously effects the development of satisfactory adhesion and wear resistance possibly by interferring with the utilization or interaction of the colloidal silica with the surface of the cementitious article being coated. Further, the solids concentration in the aqueous emulsion as applied must be less than 40% by weight and most preferably be about 30% by weight. It is not known with certainty why the surface wetting which results from the application of the aqueous dispersion with the 30% solids concentration prepares or conditions the surface of the cementitious article for the eventual development of better bond between either the elastomer or colloidal silica or both and the materials present at the surface of the article, but that result is obtained.

It is also perhaps important to the properties of the cured elastomeric coating that the aqueous dispersion exhibits a pH in the range of from about 9 to about 11.5. It is possible that this degree of alkalinity in combination with the wetting of the cementitious surface by the aqueous phase of the dispersion somehow improves the adhesion of the cured elastomeric film after the cured film has set in contact with the cementitious surface in open air for an extended period of time.

It should then be understood that the advantages derived from the present inventions are only obtained after an extended period of time beyond the time required for the recommended conventional cure of the dispersed phase to an elastomeric film by the removal by evaporation of the aqueous phase of the alkaline dispersion containing an anionic emulsion of colloidal silica and a hydroxylated polydiorganosiloxane.

The present invention can further be characterized by the following examples which are presented for purposes of illustration only and are not in any sense to be construed as limiting the scope of application of the invention as defined by the appended claims.

For the examples, unless otherwise described, the calcium concentration is selected as the benchmark for determining how fast a cementitious pipe surface will be attacked, particularly by aggressive water. For this test a short section of pipe is sealed at one end and turned upright to hold water. After preconditioning the pipe with water and rinsing, the pipe is filled with demineralized water and a stirrer and pH meter are placed into the water and an initial 10 ml aliquot sample taken for analysis. The calcium level in the sample is analytically determined and expressed in parts per million as $CaCO_3$ by standard techniques. The remainder of the test is run by constantly stirring the water, taking samples at selected time intervals and stopping at a predetermined time or when a preselected aggressive index for the water is obtained.

Aggressive index for these examples is the relationship between the pH of the water, calcium ion concentration or hardness as $CaCO_3$ in ppm and alkalinity as $CaCO_3$ in ppm and is calculated according to the following formula: A.I.=pH+Log [alkalinity times hardness] as described in ASTMC500.

EXAMPLE 1

An anionically stabilized silicone emulsion was obtained containing as described herein about 30% by weight of solids as active ingredients including the hydroxylated polydiorganosiloxane and colloidal silica. The aqueous dispersion had a pH of about 10.5, a specific gravity of between 1.01 and 1.02 and contained a cure accelerating agent.

Three nine inch lengths of 8 inch diameter class 150 asbestos-cement pipe (Johns-Manville TRANSITE® Brand) were spray coated in a conventional manner with the anionically stabilized emulsion to provide about 4 grams of dispersed phase per square foot of surface based on total solids. The coating was initially cured to an elastomeric film by the evaporation of water. This cure took less than two days. Each section of pipe was then allowed to stand in the open air for between 6 to 8 days and then tested for an increase in calcium concentration as hereinbefore described.

An uncoated section of 8 inch class 150 pipe was used as a comparison for the testing to compare the difference in the change in calcium concentration and the results are shown in TABLE 1.

EXAMPLE 2

The procedure of Example 1 was employed on three pipe sections each coated with 6.8 grams per square foot of emulsion based on the total solids in the coating. The results are shown in TABLE 1.

EXAMPLE 3

The procedure of Example 1 was employed on three pipe sections each coated with 9.2 grams per square foot of emulsion based on the total solids in the coating. The results are shown in TABLE 1.

EXAMPLE 4

The procedure of Example 1 was employed on four pipe sections each coated with 8.0 grams per square foot of emulsion based on the total solids in the coating. The results are shown in TABLE 1.

As can be seen from the foregoing TABLE 1 the increase in calcium ion concentration as $CaCO_3$ was about 4 parts per million in the water in the uncoated pipe while the increase was about half of that in water in the elastomeric coated pipes.

The same test on all samples of the examples showed only a 1 ppm increase for coatings that were tested 13 to 15 days after the initial application of the coating and virtually no increase in calcium ion concentration was detected in pipe sections where the coated pipe was tested 27 to 29 days after the application of the coating. These tests showed that a coating comprising as little as 4 grams per square foot, based on total solids, protects the cementitious pipe article better against attack by aggressive water than simply an initially cured coating, when the coated pipe surface has stood in the open air for preferably approximately about four weeks.

TABLE 1

| SAMPLE NUMBER | TIME IN WEEKS | TOTAL SOLIDS IN COATING (grams/ft$^2$) | CHANGE IN CALCIUM LEVEL (ppm as $CaCO_3$) | pH | CHANGE |
|---|---|---|---|---|---|
| Control | — | | 4 | 6.08 | 8.59 |
| EXAMPLE 1 | 1 | 4.0 | 2 | 6.35 | 8.69 |
| | 2 | 4.0 | 1 | 5.90 | 6.36 |
| | 4 | 4.0 | 0 to 1 | 5.98 | 6.21 |
| EXAMPLE 2 | 1 | 6.8 | 2 to 3 | 6.26 | 8.65 |
| | 2 | 6.8 | 0 to 1 | 5.82 | 6.24 |
| | 4 | 9.2 | 0 | 5.75 | 6.08 |
| EXAMPLE 3 | 1 | 9.2 | 1 to 2 | 5.92 | 7.35 |
| | 2 | 9.2 | 1 to 2 | 6.22 | 6.34 |
| | 4 | 9.2 | 0 | 5.75 | 6.08 |
| EXAMPLE 4 | 1 | 8 | 2 | 6.19 | 7.26 |
| | 2 | 8 | 1 to 2 | 5.87 | 6.35 |
| | 4 | 8 | 0 | 5.99 | 6.27 |
| | 4 | 8 | 0 to 1 | 5.84 | 6.47 |

EXAMPLE 5

Two sections of pipe coated with the same aqueous dispersion of Examples 1–4 to provide a coverage of 6 grams per square foot and 5.2 grams per square based on total solids providing thicknesses of 1.7 mils and 1.5 mils respectively, were subjected to the following test: At the end of open air conditioning for 27–29 days after curing the elastomeric coating, each pipe section was individually charged with 3 liters of water and three pounds of washed and cleaned 20 mesh sand (utilized in place of No. 4 aggregate). Each pipe section thus charged (with sealed end caps) was rotated on a roll table at 38 to 40 rpm to impart a tangential velocity of about 1.3 ft./sec. for a total time of 276 hours. At 50 hour intervals the roll table was stopped and each pipe section emptied and then tested with aggressive water for relative calcium leaching as in Examples 1–4. Each coated pipe section was initially charged with aggressive water having an index of approximately 7.8.

For comparison, similar pipe sections were prepared with an asphaltic coating and a coating prepared from vinyl toluene and alphamethylstyrene copolymer available under the brand name "Piccotex 120" from the Pennsylvania Industrial Chemical Corporation. These sections were subjected to the same tests with the results being summarized in TABLE II.

The asphaltic coating used for comparison purposes in the thicknesses employed has showed protection against aggressive water having an aggressive index of less than nine for as long as the thirty years in service.

TABLE 2

| COATING | SAMPLE | TOTAL SOLIDS IN GRAMS/ft$^2$ | THICKNESS (mils) | INITIAL ++ CA TEST ppm | 50 HOURS | 100 HOURS | 276 HOURS |
|---|---|---|---|---|---|---|---|
| PICCOTEX 120 | A | 8.4 | 2.3 | 0 to 1 | 1 to 2 | 1 | 3 |
| | B | 6.4 | 1.8 | 0 to 1 | 1 to 2 | 3 | |
| | C | 8.8 | 2.4 | 0 | 1 | 3 | |
| ASPHALT | A | 5.9 | 1.7 | 0 | 2 to 3 | 2 to 3 | 3 to 4 |
| | B | 5.9 | 1.7 | 0 | 0 to 1 | 0 to 1 | |
| | C | 6.9 | 2.0 | 0 to 1 | 1 | 1 to 2 | |
| ANIONICALLY STABILIZED HYDROXYLATED POLYDIORGANO-SILOXANE COATING CURED IN LESS THAN TWO DAYS AND SUB- | A | 6.0 | 1.7 | 0 | 0 to 1 | 1 to 2 | 2 |
| | B | 6.0 | 1.7 | 0 to 1 | 1 to 2 | 3 | |
| | C | 5.2 | 1.5 | 0 | 1 to 2 | 2 to 3 | |

TABLE 2-continued

| COATING | SAMPLE | TOTAL SOLIDS IN GRAMS/ft² | THICKNESS (mils) | INITIAL ++ CA TEST ppm | 50 HOURS | 100 HOURS | 276 HOURS |
| --- | --- | --- | --- | --- | --- | --- | --- |
| JECTED TO STANDING IN OPEN AIR 3 TO 4 WEEKS | | | | | | | |
| SAME WITH PIGMENT | | 6.8 | 1.8 | 0 | 3 | 4 to 5 | |

From the results shown in the foregoing examples the cementitious articles, in each case asbestos-cement pipe, were protected better against erosion from aggressive water after being allowed to stand in open air for a four week period and simultaneously developed a superior abrasion resistance to the coatings not so treated which was at least as good as the prior materials used for the same purpose. These results were achieved with a water based system for producing an elastomeric film thus avoiding the use of organic solvent or asphaltic based materials.

Superior results can be obtained by contacting the cured coating with water at an elevated temperature for a sufficient period of time for the surface of the elastomer in contact with the water to develop greater abrasion resistance than the cured elastomer exhibits without further treatment. It has likewise been established that dry heat will not produce the same result as the treatment with hot water. It is thought that these superior properties are achieved by the cleansing action of the water on the unbound constituents of the cured elastomer.

As employed herein, the dispersed phase of the aqueous emulsion requires an anionically stabilized hydroxylated polydiorganosiloxane in combination with colloidal silica. The term hydroxylated polydiorganosiloxane as used herein can also include all species of terminating groups which may be formed by emulsifying a hydroxylated polydiorganosiloxane at a pH of 9 to 11.5, such as alkali metal ions, amines or the like. Varying amounts of colloidal silica may also be employed depending on the kind of coating apparatus employed or other circumstances such as the texture, porosity or water impermeability of the cementitious article being protected. Generally however, dispersed phases containing at least about 10 parts of colloidal silica for every 100 parts of hydroxylated polydiorganosiloxane will have a measure of utility. The foregoing can of course be effected by the proportion of dispersed phase to aqueous phase selected, however optimum concentrations of these materials, as well as the kinds and amounts of accelerators and pH adjusting materials can be achieved without undue experimentation.

What is claimed is:

1. A hydraulic calcareous cementitious article having a surface exhibiting improved water impermeability and abrasion resistance comprising a cementitious article containing at least one surface coated with an aqueous dispersion of an emulsion containing a hydroxylated polydiorganosiloxane containing about two silicon-bonded hydroxyl groups and containing free silica wherein said coating on said surface is curable to an elastomeric coating of sufficient thickness that when cured and allowed to remain in contact with open air for approximately four weeks will develop the predetermined water impermeability and abrasion resistance.

2. The cementitious article of claim 1 wherein the cured elastomeric coating on the surface of the article is of sufficient thickness to reduce the amount of increase in calcium ion concentration in aggressive water in contact with such elastomeric coating as compared to the increase in calcium ion concentration in aggressive water in contact with a comparable uncoated surface.

3. The cementitious article of claim 2 wherein said elastomeric coating comprises at least 4 grams per square foot on the surface of the article.

4. The cementitious article of claim 2 wherein said aqueous dispersion, of an emulsion comprises about 30% by weight of solids.

5. The cementitious article of claim 4 wherein said aqueous dispersion of an emulsion is anionically stabilized and exhibits a pH of from about 9 to about 11.5.

6. A cementitious article for retaining or conveying water comprising:
a formed structure comprising a set hydraulic calcareous cementitious structure;
a cured and aged elastomeric coating on at least the portions of said article designed for contact with water; said elastomeric coating comprising a silicone based elastomer deposited on the said portion of said article from an aqueous dispersion and subsequently cured and aged for approximately four weeks prior to use, wherein the dispersion comprises colloidal silica and an anionically stabilized hydroxylated polydiorganosiloxane containing about 2 silicon-bonded hydroxyls per molecule and a cure accelerating agent.

7. The article of claim 6 wherein the cured elastomeric coating is substantially continuous over the portions of said article designed to be in contact with water and having a thickness sufficient to prevent as large an increase in calcium ion content in the water retained in or flowing through the article as would occur with the same article without said elastomeric coating.

8. The abrasion resistant cured elastomeric coating for the surface of cementitious articles in contact with water comprising a cured hydroxylated polydiorganosiloxane elastomeric coating which has been applied to the surface of the article from an aqueous dispersion, said cured coating then being allowed to stand in open air for approximately four weeks before the surface of the article is used in contact with water.

9. A method of treatment for rendering a cementitious article more resistant to attack by aggressive water in contact therewith comprising the steps of applying to the surface to be so treated an aqueous dispersion of colloidal silica and an anionically stabilized hydroxylated polydiorganosiloxane and an organometallic cure accelerating agent; curing the elastomeric coating by the removal of water by evaporation for a period of time sufficient to cure the elastomeric film coating and allowing the coated surface to stand in air for a sufficient period of time after cure and before use to develop greater abrasion resistance as measured by the U.S. Bureau of Reclamation test for pipe lining materials than the cured film coating initially exhibits.

10. The method of claim 9 wherein the thickness of the elastomeric film coating is sufficient to prevent as large an increase in calcium ion concentration in the water in contact with the surface of the film coating as would occur under the same conditions in water in contact with a surface not coated with said elastomeric film.

11. The method of claim 10 wherein the aqueous dispersion applied to the cementitious article comprises up to about 30% by weight of solids in a dispersed phase comprising said curable elastomer and colloidal silica.

12. The method of claim 11 wherein said aqueous dispersion has a pH of from between about 9 to about 11.5.

13. A method of treatment for rendering a cementitious article more resistant to attack by aggressive water in contact therewith comprising the steps of applying to the surface to be so treated an aqueous disperson of colloidal silica and an anionically stabilized hydroxylated polydiorganosiloxane and an organometallic cure accelerating agent; curing the elastomeric coating by the removal of water by evaporation for a period of time sufficient to cure the elastomeric film coating and then subsequently subjecting the cured elastomeric film on the coated surface to contact with water at an elevated temperature for a sufficient period of time for the surface of the elastomer in contact with water to develop greater abrasion resistance than the cured elastomer exhibits without further treatment.

14. A method of inhibiting the dissolution of soluble calcium on the surface of cementitious articles where said surface is proximate to water, comprising the steps of coating said surface with an anionically stabilized aqueous dispersion of a hydroxylated polydiorganosiloxane in combination with colloidal silica and an organometallic cure accelerating agent, said dispersion having a pH of from between about 9 to about 11.5; curing the coating to an elastomeric film by the evaporation of water; and holding the coated film and cementitious article in open air at ambient temperature for approximately four weeks prior to placing water into contact with the coated surface of said article.

* * * * *